Sept. 8, 1959  W. MEHR  2,902,789
COLLAPSIBLE FISHING ROD
Filed April 14, 1958
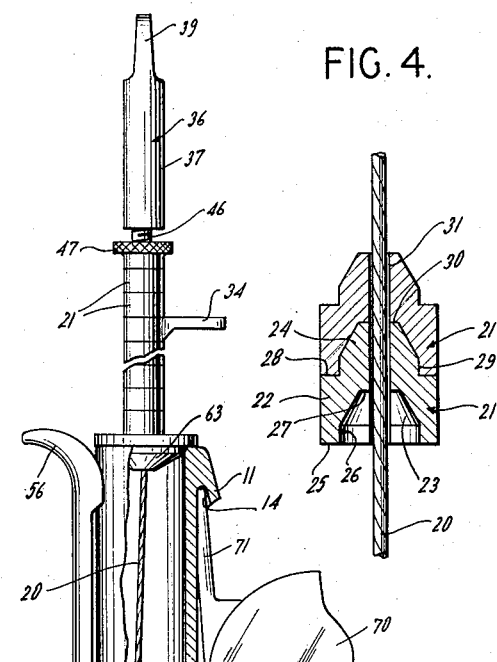
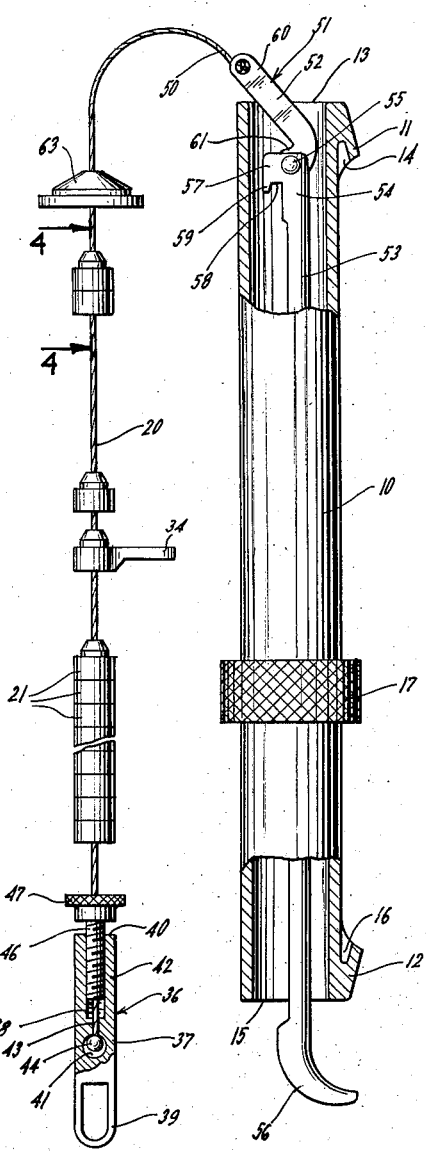
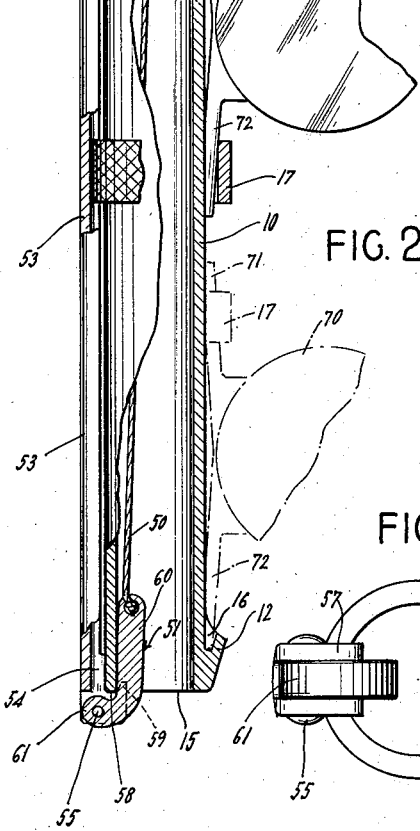
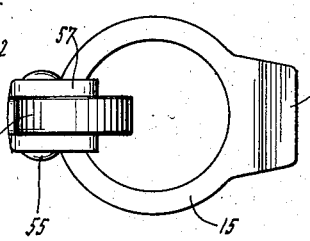
INVENTOR.
WALTER MEHR
BY
Mocker Blum
ATTORNEYS

United States Patent Office 2,902,789
Patented Sept. 8, 1959

2,902,789

COLLAPSIBLE FISHING ROD

Walter Mehr, New York, N.Y.

Application April 14, 1958, Serial No. 728,389

5 Claims. (Cl. 43—18)

This invention relates generally to collapsible rod or pole structures, and is especially concerned with such constructions as may be adapted for use in fishing rods or poles. While the device of the present invention has been primarily developed and employed for use as a fishing rod, and will be illustrated and disclosed hereinafter with particular reference thereto, it is appreciated that the instant invention is capable of many varied applications, all of which are intended to be comprehended herein.

It is one object of the present invention to provide a fishing rod or pole which is capable of being quickly and easily collapsed and set up or erected with a minimum of skill and effort, and which in its collapsed condition occupies a minimum of space, while being staunch and sturdy in its erected or set up condition of use.

It is another object of the present invention to provide a collapsible fishing pole having the advantageous characteristics mentioned in the preceding paragraph, which is extremely simple and durable in construction, trouble-free in operation throughout a long useful life, and which can be economically manufactured and sold.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a longitudinal view showing a fishing pole construction of the present invention in its collapsed or non-use condition, parts being broken away and shown in section to conserve drawing space and facilitate understanding;

Figure 2 is a longitudinal view showing the instant fishing pole construction in its set-up or erected condition of use, with parts broken away and shown in section, and an alternate condition of use being illustrated in phantom;

Figure 3 is a bottom end view of the set-up fishing rod of Fig. 2; and

Figure 4 is a sectional view taken substantially along the line 4—4 of Fig. 1.

Referring now more particularly to the drawings, and specifically to Fig. 1 thereof, the illustrated embodiment of the invention includes an open ended, generally cylindrical member or tube 10, which may have one or both ends open, as will appear hereinafter. The cylindrical member or tube 10 defines a handle in the set up assembly, and is provided externally, adjacent to its opposite ends, with a pair of opposed, inwardly facing receivers 11 and 12. More specifically, the receiver 11 is defined by a lateral, external protrusion adjacent to the handle end 13 and cut away on its longitudinally inward side to define a pocket 14 opening or facing longitudinally inward of the handle toward the opposite handle end 15.

The receiver 12 is similarly defined by an external, lateral protrusion on the handle 10 adjacent to the handle end 15, and provided with a recess or cut out 16 on its longitudinally inward side, which recess defines a pocket facing longitudinally inward of the handle toward the opposite handle end.

An annular clamping member or ring 17 is loosely circumposed about the handle 10 intermediate the ends thereof, for a purpose appearing presently. The clamping ring 17 may be externally knurled, as illustrated, for better manual grasping, and is effectively retained on the handle 10 by the laterally protruding receivers 11 and 12.

A flexible cable 20 may be fabricated of wire or rope, and is provided intermediate its ends with a plurality of centrally apertured annular members or bead elements 21 loosely and slidably circumposed about the cable. As best seen in Fig. 4, each of the centrally apertured elements or beads 21 includes a generally annular or cylindrical body 22 having an axial recess 23 extending inward from one side, and formed with an axial protrusion 24 on the other side. More specifically, the recess 23 extends inward from one end wall or surface 25 in a generally cylindrical configuration, as at 26, and thence convergent in a conical configuration, or the frustum of a cone, terminating in an end wall 27 normal to the axis of the cylindrical body 22. The protrusion 24 is shaped for conforming engagement in the recess 23 of the next adjacent element 21, projecting axially from the body end wall 28 in a cylindrical configuration at 29, and thence convergent in a conical configuration or frustum of a cone, terminating in an end surface 30 normal to the body axis. Coaxially of the body 22 is formed a through hole or bore 31 opening at its opposite ends through the recess end wall 27 and protrusion end wall 30. Thus, as seen in Fig. 4, adjacent centrally apertured elements 21 are shaped for rigid interfitting engagement with each other in the direction longitudinally of the cable 20 in their limiting position of movement toward each other.

Certain of the apertured elements 21 are provided with a radial or lateral projection, as at 34, which is apertured to define a line receiving eye.

On one end of the cable 20 is an abutment, generally designated 36. The abutment 36 includes an elongate anchor member or end piece 37 having an internally threaded bore 38 extending inward from one end, and provided on its other end with a closed loop or eye 39. Stated otherwise, the end piece 37 is of elongate configuration having the loop or eye 39 projecting longitudinally from one end, and an internally threaded bore 38 extending inward through the other end 40 and terminating in spaced relation with respect to the eye. A transverse through hole 41 is formed in the end piece 37 spaced intermediate the eye 39 and the internally threaded opposite end portion 42. One end portion 43 of the cable 20 extends inward through the end 40 of the end piece 37, being spacedly received in the bore 38, and extends thence through the end wall of the bore longitudinally of the end piece into the opening 41. In the opening 41, the cable portion 43 is provided with an enlargement or retaining head 44, whereby the cable end portion 43 is anchored to the end piece 37.

The abutment 36 also includes a screw 46 having an enlarged, preferably knurled head 47. The screw 46 is formed with an axial, open ended bore or hole extending through both the shank and head of the screw, and slidably receiving the cable 20. As best seen in Fig. 1, the shank of screw 46 is threadedly engaged in the bore 38 of the anchor 37, with the screw head or end enlargement 47 located adjacent to and outward of the anchor end 40. By this construction, the cable end portion 43 is received axially in the abutment 36; and, the abutment head 47 is adjustable longitudinally of the end piece 37 by its threaded engagement therewith, for purposes appearing presently.

Connected to the other end of the cable 20, as at 50, remote from the abutment 36, is a pull mechanism, generally designated 51. The pull mechanism is removably carried in the handle 10 and includes an angulate or generally L-shaped link 52 having the free or distal end of its longer arm 60 secured to the cable end portion 50. A relatively long lever 53 is illustrated as located interiorly of the handle 10 in Fig. 1. One end portion 54 of the lever 53 is pivotally connected, as by a pin 55 to the distal end of the shorter arm 61 of angulate link 52. The other end portion 56 of the lever 53 is located exteriorly of the handle 10 adjacent to the handle end 15, and provided with a lateral extension or enlargement to prevent its entry into the handle, and therefore prevent removal of the lever 53 and pull mechanism 51 from the handle 10 through the handle end 13.

The lever end portion 54 is provided with a generally hook-shaped lateral projection 57 extending generally normal to the axis of pivot pin 55. The projection or extension 57 may be considered as defining by its longitudinally inner edge 58 a lateral shoulder on the lever facing toward the opposite lever end 56. Further, the shoulder 58 may be considered as notched, see Fig. 1, to provide a finger or catch 59 spaced laterally outward from and extending longitudinally of the lever 53 toward the opposite lever end 56.

Slidably circumposed about the cable 20 between the pull mechanism 51 and apertured elements 21 is a relatively large apertured element or closure member 63. That is, the apertured element 63 is similar to the apertured elements, but of considerably greater diameter such as to seat on the handle end 13 in closing relation with respect thereto. Specifically, the relatively large apertured element 63 is of generally circular or annular configuration and provided on its side adjacent to the annular elements 21 with a recess, not shown, substantially identical to the recess 23 described hereinbefore for conforming reception of the protrusion 24 of the adjacent annular apertured element. Thus, in the illustrated embodiment, the handle 10 has its end 13 open, and the apertured element 63 is provided to close the latter handle end in the set-up condition, as will appear presently.

However, it is understood that the handle end 13 may be closed, if desired, by the provision of an apertured end closure fixed thereon, enabling the apertured element 63 to be eliminated.

In setting up the instant fishing pole from the condition of Fig. 1 to that of Fig. 2, the pull mechanism 51 is withdrawn through the handle end 15 and the apertured elements 63 thereby drawn toward the handle end 13. The lever 53 is then arranged exteriorly of the handle or tube 10, with the handle end edge 15 engaged with the notch or shoulder 58, so that the shoulder projection 59 is located interiorly of the handle and the link 52 has its shorter arm 61 projecting from the handle through its end 15. This enables the lever arm 53 to be swung toward and away from the handle 10 about the portion of handle edge 15 received in the notch and bearing against the shoulder 58 as a fulcrum. This swinging movement of the lever 53, and particularly of its enlarged end portion 56 toward the handle 10, to the position of Figure 2, serves to shift the pivot pin 55 from the same side of the fulcrum edge. That is, the pivot pin 55 and its connected end of the link 52 are swung beyond alignment with the fulcrum edge 15 and the link end connected to the cable portion 50, so that a togglelike action occurs wherein tension in the cable serves to retain the lever 53 in its inwardly swung position and lock the link 52 against the cable pull.

Of course, in order to obtain the desired tautness of the cable 20 for effecting the hereinbefore described locking action of the pull mechanism 21, it is essential that the abutment head 47 of screw 46 be adjusted longitudinally of the end piece 37 by its threaded engagement in the latter to selectively adjust the effective length of cable 20 from the link 52 to the abutment head.

Collapse of the erected structure of Figure 2 may be very quickly accomplished by mere outward swinging movement of the lever end portion 56 away from the handle 10, and subsequent extension of the link 52 and lever into the handle through the handle end 15.

As best seen in Figure 2, a fishing reel, which may be conventional, is there generally designated 70, and provided with a pair of oppositely extending outwardly tapering feet 71 and 72. The feet 71 and 72 are adapted to seat on the exterior of the handle 10, extending longitudinally thereof, the reel being illustrated with foot 71 engaged in pocket 14 of receiver 11. The annulus or clamping ring 17 may then be slipped over foot 72 for frictional holding engagement therewith, to thus mount the reel on the handle at a location spaced from the inner handle end 15.

As may be preferred in certain types of fishing, the reel 70 may be optionally located adjacent to the inner end of the handle, as shown in phantom in Figure 2. In this condition, the reel foot 72 is engaged in the pocket 16 of receiver 12, and the clamping ring 17 frictionally engaged about the reel foot 71.

Of course, the line eyes 34 and 39 serve to receive and guide a fishing line extending from the fishing reel. A fishing line is not illustrated, as it forms no part of the instant invention.

From the foregoing it is seen that the present invention provides a collapsible pole structure of the type described which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims. For example, it is appreciated that the handle 10 may be of a telescopic or articulated construction rather than as illustrated, for further reduction in collapsed size, without departing from the invention.

What is claimed is:

1. A collapsible rod construction comprising an elongate tubular handle, a flexible cable, a plurality of centrally apertured elements slidably circumposed about said cable for movement thereon toward and away from each other, said apertured elements being shaped for rigid interfitting engagement with each other longitudinally of said cable in their position of movement toward each other, an abutment on one end of said cable, a generally L-shaped link having one end connected to the other end of said cable, and a lever loosely received in said handle for withdrawal from one handle end and having one end pivotally connected to the other end of said link, said lever being formed adjacent to its one end with a lateral shoulder engageable with said one handle end when said lever is withdrawn from said handle to mount said lever for swinging movement toward and away from said handle about said one handle end as a fulcrum, swinging movement of said lever toward said handle about said fulcrum serving to shift said other link end beyond alignment with said one link end and said fulcrum for locking said link against the pull of said cable.

2. A collapsible rod according to claim 1, in combination with a lateral enlargement on the other end of said lever to prevent its withdrawal through said one end of said handle.

3. A collapsible rod according to claim 1, said abutment comprising an end member anchored to said one cable end and having an internally threaded portion extending inward from said one cable end and spacedly surrounding the adjacent portion of said cable, and a headed screw having a longitudinal through bore engaged in said internally threaded portion and receiving the adjacent cable portion in said bore, the head of said screw being abuttingly engageable with the adjacent apertured element when said cable is pulled.

4. A collapsible rod according to claim 1, each of said apertured elements comprising a generally annular body having a generally conical axial protrusion on one side and formed with a generally conical axial recess on the other side for conforming reception with the protrusion of the next adjacent apertured element.

5. A collapsible fishing rod comprising an elongate handle, a flexible cable, a plurality of centrally apertured elements slidably circumposed about said cable for movement therealong toward and away from each other, said apertured elements being shaped for rigid interfitting engagement with each other longitudinally of said cable in their position of movement toward each other, certain of said apertured elements being provided with laterally projecting line eyes, an abutment on one end of said cable, and a pulling mechanism carried by said handle and connected to the other end of said cable for releasably pulling the latter toward said handle, said pulling mechanism comprising an angulate link having one end connected to said other cable end, and a lever having one end pivotally connected to the other end of said link, said lever being formed adjacent to said one end with a notch engageable with an end of said handle to mount said lever for swinging movement about said handle end as a fulcrum, for shifting said other link end beyond alignment with said one link end and said fulcrum to lock said link against the pull of said cable.

References Cited in the file of this patent

UNITED STATES PATENTS

| | | |
|---|---|---|
| 2,656,639 | Phillipson | Oct. 27, 1953 |
| 2,787,484 | Macy | Apr. 2, 1957 |
| 2,822,896 | Schuster | Feb. 11, 1958 |

FOREIGN PATENTS

| | | |
|---|---|---|
| 165,616 | Germany | Oct. 8, 1904 |